(12) United States Patent
Newlin

(10) Patent No.: US 8,702,140 B2
(45) Date of Patent: *Apr. 22, 2014

(54) DOUGH BALL LIFTER

(75) Inventor: Jon M. Newlin, French Lick, IN (US)

(73) Assignee: Papa John's USA, Inc., Louisville, KY (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/317,774

(22) Filed: Oct. 28, 2011

(65) Prior Publication Data

US 2012/0098286 A1    Apr. 26, 2012

Related U.S. Application Data

(63) Continuation-in-part of application No. 12/804,975, filed on Aug. 3, 2010, now Pat. No. 8,104,808.

(51) Int. Cl.
 *B66C 1/42* (2006.01)
 *B66C 15/00* (2006.01)

(52) U.S. Cl.
 USPC .......................................... 294/106; 294/198

(58) Field of Classification Search
 USPC ......... 294/106, 15, 16, 26, 28, 198, 201, 204; D8/52; 425/276, 280, 283, 318
 See application file for complete search history.

(56) References Cited

U.S. PATENT DOCUMENTS

| | | | |
|---|---|---|---|
| 2,003,197 A * | 5/1935 | Jackson | 425/285 |
| 4,047,626 A | 9/1977 | Meisel | |
| 4,057,276 A | 11/1977 | Currie | |
| 4,059,886 A | 11/1977 | Bricon | |
| 4,253,560 A | 3/1981 | Cross | |
| 5,080,572 A | 1/1992 | Sage | |
| D342,002 S | 12/1993 | Sage | |
| 7,179,078 B1 | 2/2007 | Bauer | |
| 7,207,610 B1 | 4/2007 | Kauppila | |
| 2007/0262089 A1 | 11/2007 | LeGreve | |

* cited by examiner

*Primary Examiner* — Paul T Chin

(57) ABSTRACT

For use to enhance operations in a mechanized doughmaking facility, disclosed is a dough ball lifter comprised of a pair of opposing surrounds, having cutaways to minimize contact between the surrounds and the dough ball, and which lifter preferably is attachable to a robotic arm to move the surrounds from open to closed positions, so that the dough ball can be lifted and placed.

2 Claims, 3 Drawing Sheets

DOUGH BALL LIFTER

CROSS-REFERENCE TO RELATED APPLICATION

This application is a continuation-in-part of application Ser. No. 12/804,975, filed Aug. 3, 2010, now U.S. Pat. No. 8,104,808.

The invention operates to lift and place balls of dough from one means of conveyance to another, without damage to the dough ball and with minimal sticking of the apparatus to the dough ball.

BACKGROUND OF THE INVENTION

Baking dough is made, formed and conveyed by mechanical means in a modern bakery operation. A premeasured amount of dough is portioned out, then formed into balls of dough. Typically, the portion or ball of dough is moved, either manually or by endless conveyors, from one preparation stage to the next.

The prior art discloses conveyors and ramps that rely on the "force of gravity" (U.S. Pat. No. 5,396,833) to convey dough balls from one preparation station to the next; and the use in automated processes of manually lifting and placing of dough balls, e.g., U.S. Pat. No. RE34,530 noting "labor intensive . . . manual individual positioning," and U.S. Pat. No. 4,915,056 disclosing "manually moving the dough balls about . . . to dust them with flour, the attendant then manually picks up the dough balls, one at a time in each hand, and places them onto" next station.

To reduce the doughmakers manually moving dough balls in an automated bakery process, suction lifting means have been tried (see, U.S. Pat. No. 6,554,336 disclosing "suction gripper" for food items). The suction or vacuum devices often damage the dough ball, and too, these devices are susceptible to clogging with dough or sticking to the unbaked dough.

A need exists for mechanical apparatus, combinable with automated dough preparation equipment, which provides the utility of lifting dough balls without damage and with minimal sticking, and of placing the balls of dough on the next means for conveying the dough balls through the dough and bakery process. This aim is achieved by the present invention.

WRITTEN DESCRIPTION

Figure 1:
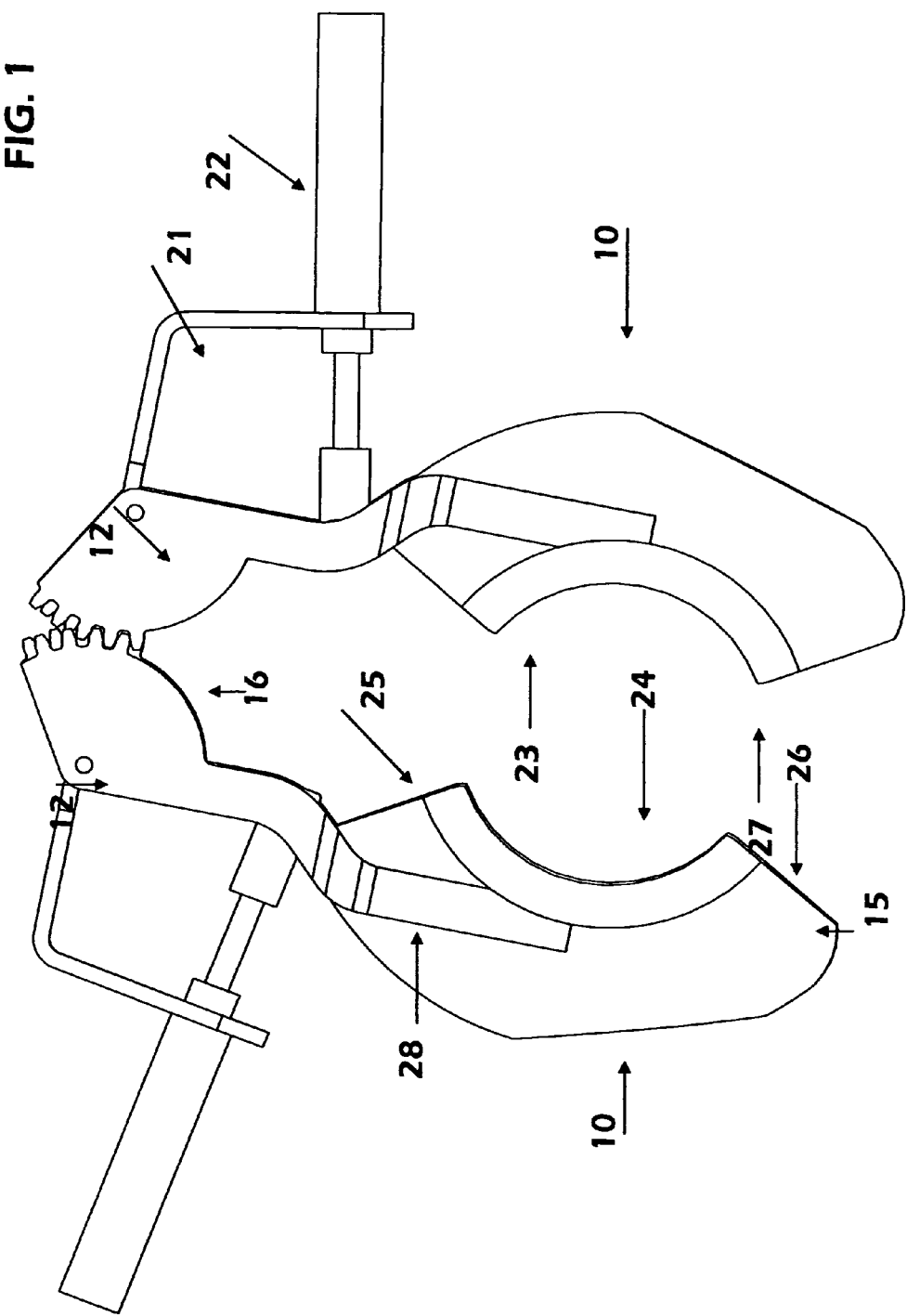
FIG. 1 depicts the invention in a side view.

In automated bakery goods processing, ingredients are mixed to form baking dough. Dough is made in batches, then separated into premeasured portions, and rounded into dough balls. In a commissary for supplying quick service restaurants, a final step is to load and position the fresh dough balls in dough trays, which are delivered to the quick service restaurants.

When conveyed to the final preparation stations in the commissary, the dough is in a globular shape, or perhaps a plano-globular form, that is, a globular body with a flat bottom. The ball of dough has a typical size and weight, and a preferred shape, which correlate to the baked product that will be made using it. To automate the step of taking the dough ball from where it lies on the conveying apparatus, and moving it to another station for further processing, or to position it on a dough tray for transport, the mechanism should be moveable to surround the dough ball, then adjustable to close around the dough ball, but not so as to damage it or substantially deform it, then the mechanism should be controllable to keep closed around the dough ball until the mechanism, by transport means external to it, lifts it and positions it over the point to which the dough ball is intended to be moved, then with the mechanism should be moveable to an open position and controllable to place the dough ball in a chosen location when it is released from the mechanism.

The present invention is comprised of a pair of elements 10, dimensioned to surround a dough ball at rest on a generally flat surface such as a conveyor belt, and having pivot points 11 which, with external force, urge the pair of tong elements 10 to be moved to a near-closed relation or lifting position, as well as urged apart to an open relation or depositing position, and having elements that extend up, across axis points 12 to cooperating edges 16 that permit more precise mechanical movement between the pair of tong elements.

In one preferred embodiment, the dough ball clammer embodies the pair of tongs 10, which are concave or cup-shaped with the center area 13 of the concavity 14 being open, and with a lower scraper edge 15 on the base of each tong that conforms generally to the flat conveying surface on which the dough ball will rest, and each tong 10 has an upper portion on which are pivot points or mechanical receivers for receiving motive force from a device external to the invention such as 22, and also, on each tong are levers 28 that extend up to axis points or projections on an external bracket and extend to edges or gears that mechanically cooperate, such as rack of teeth 16 that mesh or projections that interact. Each tong in this sort of a preferred embodiment resembles a clamshell with an open back portion 13, which reduces the contact surface area between the apparatus and the dough ball, and provides a port for air to escape. Also preferred for reducing the surface contact area is to cut away portions of the tong. One preferred embodiment has three cutaways along the edges of the tong that come together with the other tong of the pair, and are a semi-circular cutaway 24 that extends between lower cutaway 26 and upper cutaway 25 areas, which typically are parabolic cuts across the cup-shaped upper and lower edges of the tong. Charted around the edges would be the line defining the scraper edge, joined to a lower cutaway, up to a semi-circular cutaway, then to an upper cutaway across the top of the tong, then to a second semi-circular cutaway, down to a second lower cutaway, and back to the scraper edge.

Figure 2:
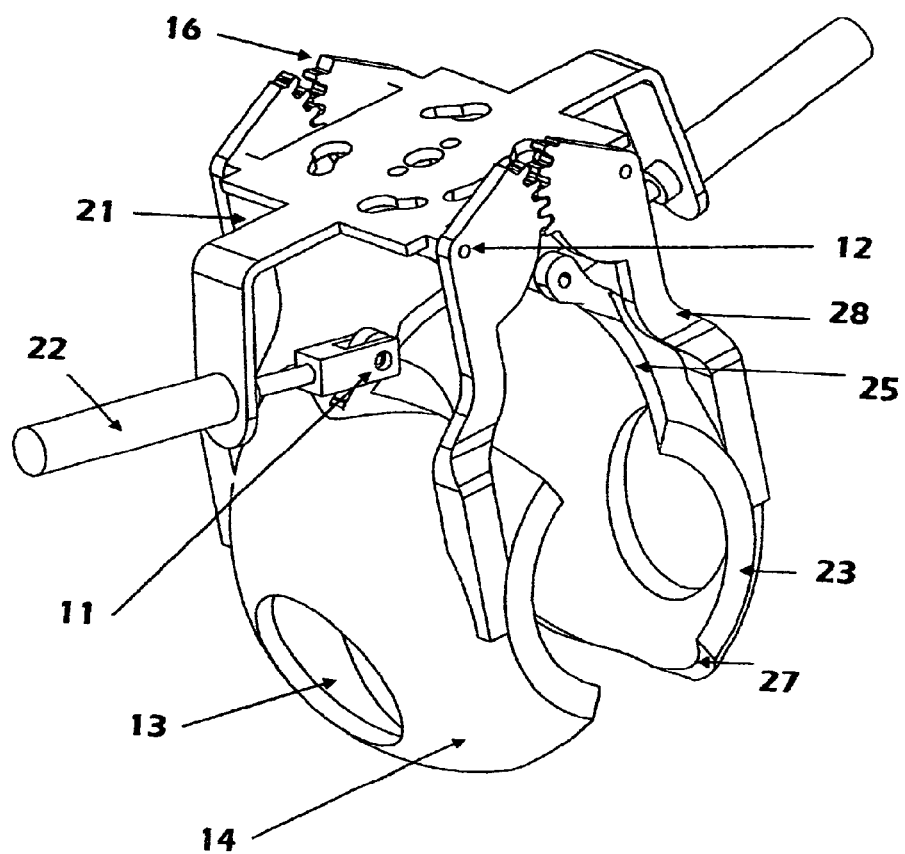
FIG. 2 depicts a view of the invention that shows the pivot points and axis points, and the external mounting bracket and powered cylinders.
Figure 3:
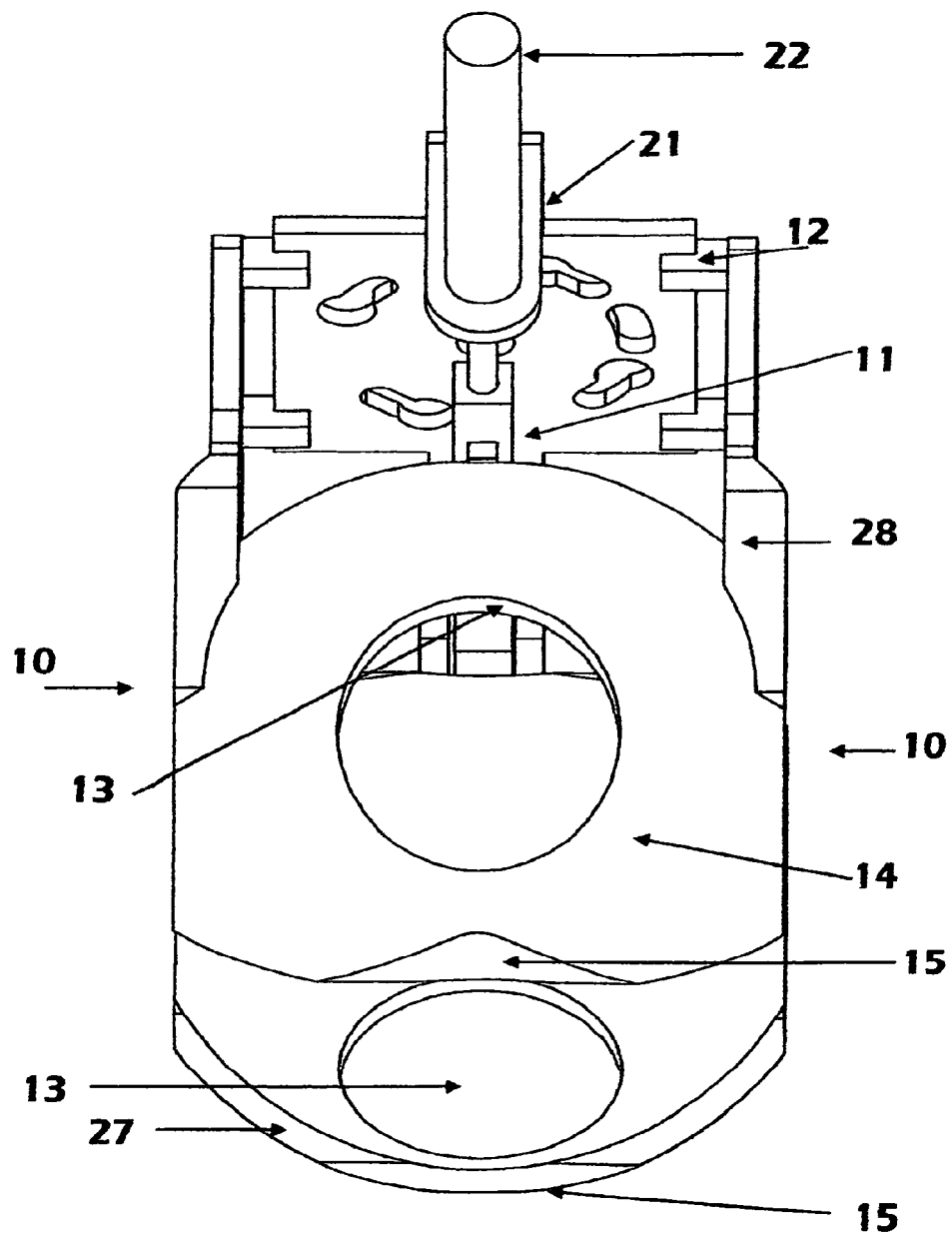
FIG. 3 depicts the invention from below, showing the scraper edge.

The embodiment in the FIGS. 2 and 3 has a carriage, extending from and above each clamshell holder, which serves as a lever, and is provided with an axis point 12 located preferably at a point of rotation predetermined to permit the holders 10 to move from apart or closer to the other. Also there is a pivot point 11 above each holder that preferably receives a rod that pushes and pulls the pair of transporter elements from an open to a closed position, and open again. As the holders 10 hinge open and closed on the axis point 12, the rack of cogs 16 engage and provide mechanical cooperation for more precise opening and closing movements between the pair of tongs, and can embody a limit on the travel distance between the pair of dough lifters.

In one preferred embodiment, the apparatus has two, essentially-similar pieces, each lifter piece 10 being formed as a single part. The pair of one-part pieces could be constructed of separate parts, such as 14 and 28, joined together solidly in an embodiment of the invention.

Describing the structural aspects of the invention entails orienting the features, starting from the bottom of the apparatus, which may contact the flat work surface or conveying surface on which the dough ball rests. In operation, the apparatus 10 of the present invention is moveable above that conveying surface, and above the apparatus is an external device such as a robotic arm with air-powered cylinders 22, and which has a mounting bracket 21 to which the invention can be removably connected. The following describes embodiments of the invention, starting at the work surface and continuing up to the external bracket and powered cylinders of the robotic arm.

An embodiment of the present invention would have a base, scraper edge 15, having a generally planar portion to contact the work or conveyor surface on which the dough ball rests. A generally planar base scraper is useful to coax the dough ball off the conveyor surface and minimize dough being partly separated from dough ball and left on the surface. That embodiment of the scraper edge is preferred, even though it is typical in the art for the dough conveyor and work surfaces to have some non-stick coating. Joined to the base scraper is a tong with a concave shaped 14 center, with a portion open 13 around the center of the concavity of the tong, and surround edges that extend generally from the base scraper upward along the edges of the pair of tongs that face one another. The tong generally conforms to the measured sphericity of the typical dough balls being produced and moved. Aspects of this type of embodiment include a clamshell surround with a forward and a rearward arcuate cutaway portion 23, 24 that subtend from an upper cutaway portion 25 to a forward and a rearward base cutaway portion 26, 27. In general, the surround edges preferably track a semi-circular shape from bottom to top, such that when the pair of tongs of the present invention are moved together, the surround edges 23, 24 will define an opening between the tongs. That opening, as well as the opening 13 in the concavity of each tong, serve to reduce surface contact between the tong apparatus and the dough ball and to allow air to pass off from the freshly-made dough ball. It too is preferred for the tong to be cut away 27 between the surround edge 23 and the base scraper 15, again to minimize surface contact area, but to have contact surface adequate to pick up the dough ball, to retain its globular shape.

In the embodiment shown in FIG. 2, approximately at the top center part of the tong is a pivot point 11. That top center location is advantageous, but the pivot point might work as well when located elsewhere on the upper half of tong. In the embodiment shown, the placement is due, in part, to the configuration of the mounting bracket 21 and the powered cylinders 22 on a typical robotic arm device. In that working embodiment, the pivot point is placed between a pair of levers or arms 28 that extend from the outside edges of the tong, upward across an axis point 12 and terminate at a row of saw teeth 16 or cogs. The force of the powered cylinder 22 being imparted against the pivot point 11 causes the levers to rotate on their axis points, and move the tongs 10 together. More precise movement of the tongs is enabled by the mechanical cooperation between the sawtooth elements, which are positioned circumferentially along the termination edges of the lever arms 28. The axis point 12 is located on the arm or lever preferably at a spot in between the pivot point 11 and the saw tooth rack 16 that allows rotational movement around the axis, and opening and closing movements between the tongs.

It is advantageous for the tongs to be moved by at least one powered cylinder, and in the preferred embodiment, each tong is moved by its own cylinder. A pair of cylinders is preferred so as to provide a more precise movement between the tongs, however, with the sawtooth elements on each lever, a single cylinder is a workable alternative.

The claimed invention does not include the external devices, that is, the power cylinders and its connectors, and the mounting bracket. Persons skilled in the art will be able to connect the claimed invention to any of several types of brackets, robotic arms, and powered cylinders, so as to accomplish the functions provided by the claimed apparatus.

In use, the lifter apparatus is attached to a robotic arm, driven by a programmed computer. A typical embodiment has a pair of air-powered cylinders 22 on a mounting bracket 21. Movement of the bracket 21 and powering of the cylinders is activated by software and a computer, which assures precise movement of the bracket, cylinders, and of the lifting apparatus. The apparatus is manually attached to the mounting bracket and cylinders. With a typical embodiment, the attachments are the insertion into the axis point openings 12 on the lever arms 28 of pins on the mounting bracket 21, and insertion of pins to connect the piston ends of the cylinders to the pivot points 11 on the back of the clamshell portions of the lifter apparatus. The related task to making sure that the gear tooth segments 16 on each lever engage with one another, such that the levers 28 can rotate on the axis points and enable the pair of clamshell portions to move together and apart in a predetermined path.

The operation of the apparatus is mechanical and driven by the controls for the robotic arm and powered cylinders. In a typical embodiment, the apparatus would move over a conveyor for dough balls, and over a dough tray. Persons with skill in the art understand that fresh dough balls are delivered in dough ball trays, which typically are flats made of food-grade polymeric material. The lifter apparatus would be in an open position with the pair of clamshell portions moved apart by the cylinder. The open position is used before surrounding a dough ball to lift it from the conveyor, and is used to release a lifted dough ball being placed on a dough tray. The external cylinders 22 provide a motive force to push the lifter apparatus to a closed position, such that it surrounds a dough ball to be lifted. Using those programmed movements, the lifter apparatus in the open position would be moved by the robotic arm over a dough ball on the conveyor. The usual dough ball has been formed into a globular shape, and has some cohesiveness, but too can be fragile or easy to deform or to pull apart. The apparatus 10 moves down, surrounding the dough ball, placing the clamshell portions around the dough ball, with the base scraper edge 15 moving in contact with or close to the conveyor surface. The clamshell shape is predetermined to accommodate the shape of the doughball. The cylinders 22 are actuated, pressing against the pivot points, moving the apparatus to a closed position, around and in contact with the dough ball. The open back 13 of the clamshell portion, and the cutaway portions 23, 25, 27 on each tong, minimize the surface contact area between the lifter apparatus and the dough ball. The external robotic arm lifts the apparatus 10 with the dough ball closed between the pair of tongs, and the dough ball is picked off of the conveyor surface, and the arm moves the apparatus over a dough tray and when positioned at the desired location, the apparatus is lowered into contact or close to the dough tray, the tongs are moved to the open position by the powered cylinders. The apparatus 10 releases the dough ball and it is places at desired location on the dough tray. Then, the apparatus is moved back over the conveyor, and the lift and place steps are repeated, until the tray has the desired number of dough balls on it.

The present invention has been described with the specificity and illustration needed to show the preferred embodiments, however, persons of skill in the art would understand that alternative embodiments are within the scope of the claimed invention.

I claim as my inventions:

1. An article of manufacture for lifting dough in an automated bakery, comprising a pair of hemispheric tongs, each tong of said pair having a scraper edge, a surround portion with a concave contact surface, the center area of the concavity being open, an upper carriage portion; supporting each tong of said pair of hemispheric tongs, and having a pivot point for receiving an external motive force, and an axis point on which said upper carriage portion rotates to enable said concave contact surface on each tong to travel to a closed position for lifting and apart to an open position for placing, and, wherein each upper carriage portion further comprises a rack of gears that engage to limit the travel of each said tong between the open position and the closed position.

2. Lift and place apparatus operable by a robotic or mechanized arm, comprising, a transporter, paired with an opposing transporter, each said transporter having at its base a scraper edge joined to an open-backed, hemispheric surround with arcuate cutaways that subtend from upper cutaways to base cutaways adjacent to said scraper edge, and having a pivot point located above the open back of said hemispheric surround, said pivot point to receive motive force, and having a lever to support each said transporter, each said lever joined to said hemispheric surround and each said lever extending across an axis point and each said lever having a gear tooth segment to engage with a gear tooth segment on the lever of said opposing transporter.

* * * * *